US007895724B1

(12) United States Patent
Dugan

(10) Patent No.: US 7,895,724 B1

(45) Date of Patent: Mar. 1, 2011

(54) COLOR-CODED METHOD FOR TOOLS

(76) Inventor: Timothy W. Dugan, Donalsonville, GA (US)

( * ) Notice: Subject to any disclaimer, the term of this patent is extended or adjusted under 35 U.S.C. 154(b) by 1211 days.

(21) Appl. No.: 11/516,445

(22) Filed: Sep. 6, 2006

Related U.S. Application Data

(63) Continuation-in-part of application No. 10/830,883, filed on Apr. 26, 2004, now abandoned.

(51) Int. Cl.
*B23Q 17/00* (2006.01)
*G01M 19/00* (2006.01)

(52) U.S. Cl. ........................ 29/407.01; 29/458; 81/119; D8/21; D8/22; D8/23; D8/24; D8/25

(58) Field of Classification Search .............. 29/407.01, 29/458; 81/119, DIG. 5; D8/21–29
See application file for complete search history.

(56) References Cited

U.S. PATENT DOCUMENTS 4,936,170 A 6/1990 Zumeta
4,982,627 A * 1/1991 Johnson ..................... 81/121.1
5,031,488 A 7/1991 Zumeta
5,498,158 A 3/1996 Wong
6,082,227 A 7/2000 Vogel
6,393,950 B1 * 5/2002 Crosser ....................... 81/119
2004/0216566 A1 11/2004 Shih

* cited by examiner

*Primary Examiner*—Paul D Kim
(74) *Attorney, Agent, or Firm*—George L. Williamson

(57) ABSTRACT

A method for identifying tools using the steps of providing a tool, wherein the tool is chosen from the group including a wrench, a socket, a nut, and a bolt; applying an indicator being a color-coded indicia onto the tool, wherein the indicia is visible to a user, wherein the indicia aids in identifying the tool, wherein the colors are chosen from the group including blue, red, orange, yellow, green, brown, violet and light gray; wherein the indicia is a band, the band being substantially flat, the band being raised an effective distance above the surface of the tool, wherein the band can be felt by a user, wherein the band aids in identifying the tool; and, wherein the band has a single portion, wherein the single portion can be felt by a user to identify English size tools. The method uses a band having two interconnected portions, wherein the two interconnected portions can be felt by a user to aid in identifying metric size tools. Also, the indicator may be a protrusion shaped like a tear-drop, an "X" or "O" shaped indicator, or an o-ring shaped indicator.

10 Claims, 11 Drawing Sheets

COLOR-CODED METHOD FOR TOOLS

RELATED APPLICATIONS

This application is a Continuation-in-Part of U.S. patent application Ser. No. 10/830,883 filed Apr. 26, 2004, now abandoned by the Applicants.

BACKGROUND OF THE INVENTION

1. Field of the Invention

The present invention relates generally to tools and, more particularly, is concerned with a method for identifying the size of tools.

2. Description of the Prior Art

Coding systems have been described in the prior art; however, none of the prior art devices disclose the unique features of the present invention.

U.S. Pat. No. 4,982,627 to Johnson dated Jan. 8, 1991 disclosed color coded tools. U.S. Pat. No. 6,082,227 to Vogel dated Jul. 4, 2000 disclosed a visual coding system for tool size. U.S. Pat. No. 6,393,950 to Crosser dated May 28, 2002 disclosed color coded tools. U.S. Patent Application Publication US2004/0216566 to Shih dated Nov. 4, 2004 disclosed applying two pieces of tape to tools.

In U.S. Pat. No. 6,082,227, dated Jul. 4, 2000, Vogel discloses a novel system for visually coding tools as to their size which comprises a maximum of two sets of differently colored bands which are placed on the surface of the tool. Each band of each color represents a portion of the size of the tool. Thus, when the number of bands of each color is counted, the size of the tool is indicated. Different colors are used to indicate metric tools versus English tools. Different color schemes may be used to represent the ownership of the tools.

In U.S. Pat. No. 4,982,627, dated Jan. 8, 1991, Johnson disclosed a color code tool identification method for the instant determination of the size of various types of hand tools and small cutting tools such as drill bits. A color chart is provided showing a range of ten colors. Each color indicates a particular numeral. The sequence of the indicated numerals provides a size designation for the tool. The method provides fractional inch size determination and also metric size determination. The method may be used alone or in conjunction with conventional marking methods.

In U.S. Pat. No. 4,936,170, dated Jun. 26, 1990, Zumeta disclosed a color coding system primarily for implements including tools or other hand-manipulated devices, whereby individual colors are applied to tools of a series having diverse sizes, such diversity of size following an orderly scheme, such as having like denominators with incremental numerator differences.

In U.S. Pat. No. 5,031,488, dated Jul. 16, 1991, Zumeta disclosed a color coding system primarily for implements, including tools, instruments or other hand-manipulated devices, whereby individual colors are applied to tools of a series having diverse size, such diversity of size following an orderly scheme.

In U.S. Pat. No. 5,498,158, dated Mar. 12, 1996, Wong disclosed a set of endodontic cutting instruments, each having handles and each having a different working tip diameter incrementally increasing in size from one instrument to the next. The set includes a first smaller standard size endodontic cutting instrument having a grasping end with a first color according to a standard color code, a second larger standard size endodontic cutting instrument having a grasping end with a second color according to the standard color code and a non-standard intermediate size endodontic instrument having a size between the first smaller standard size and the second larger standard size and having a grasping end with a color combination including a first portion having the first standard color corresponding to the first smaller standard size and as second portion having the second standard color corresponding to the second larger standard size.

In U.S. Pat. No. 6,393,950 B1, dated May 28, 2002, Crosser disclosed the tools (wrenches) of this invention which provide a one-color instant identification of color coded tools. Preferably, the tools have a portion of the outer surface colored. Typically the color impregnates the metal or plating during the manufacturing process. Another embodiment is a color appliqué, band or sleeve on the outer surface of the tools. The key of this coloring is to identify the tool quickly by coloring a large area of the tool. This provides for quick identification of the tool even if the numerical designations are illegible because of small sizing or dirt obliteration. In a preferred embodiment, virtually the entire tool is colored during manufacturing. In another preferred embodiment, large raised numbers combine with the overall color scheme to make the tools quickly identifiable. Dirtying the large colored surface is very unlikely as is obliterating the large raised fractional numbers.

While these color coding systems may be suitable for the purposes for which they were designed, they would not be as suitable for the purposes of the present invention, as hereinafter described.

SUMMARY OF THE PRESENT INVENTION

The present invention provides a method for identifying tools using the steps of providing a tool, wherein the tool is chosen from the group including a wrench, a socket, a nut, and a bolt; applying an indicator being a color-coded indicia onto the tool, wherein the indicia is visible to a user, wherein the indicia aids in identifying the tool, wherein the colors are chosen from the group including blue, red, orange, yellow, green, brown, violet and light gray; wherein the indicia is a band, the band being substantially flat, the band being raised an effective distance above the surface of the tool, wherein the band can be felt by a user, wherein the band aids in identifying the tool; and, wherein the band has a single portion, wherein the single portion can be felt by a user to identify English size tools. The method uses a band having two interconnected portions, wherein the two interconnected portions can be felt by a user to aid in identifying metric size tools. Also, the indicator may be a protrusion shaped like a tear-drop, an "X" or "O" shaped indicator, or an o-ring shaped indicator.

In the field of general and/or specialized mechanical repair and maintenance and also in many types of assembly work, the nuts, bolts and tools that are used are often of both the English and metric systems of measurement. Ultimately, these tools or fasteners get mixed together in the work environment. The nuts and bolts often get dropped out of the wrenches or sockets and sometimes get lost during the installation or removal process. Often the nuts or bolts that need to be removed by the user are visually obstructed or the work place is poorly lighted. The user must rely on feeling the nuts or bolts, and at best can only guess if they are fractional or metric fasteners. Much valuable time is lost sorting through the tools and fasteners just to determine the English from the metric system of measurement needed for a particular job. More time is lost searching for specific sizes of a relatively small group of the more repeatedly used tools or fasteners, and still more time is lost recovering dropped or lost nuts and bolts.

Those inconveniences waste valuable time and can cause the user to become confused or frustrated, creating an uncomfortable work environment. A much more advantageous and user-friendly method for the use of tools and fasteners is needed.

Because frequently nuts or bolts will fall from the wrenches or sockets while they are in use, the present invention provides an additional function: it allows the nuts and bolts of this invention to temporarily be secured into the wrenches or sockets so they are not easily dropped during installation and removal. This function would greatly aid many physically impaired persons, as well as persons with no impairments.

The age old traditional method of imprinting the number or numbers onto or into the surface of the tools to designate the specific incremental numeric sizes of both the English fractional and metric millimeter tools presents several problems. The size markings are often difficult to read because of their small size, poor lighting, or because of dirt and grease obscuring the size markings. All of the tools bear resemblance to one another because they are all marked with numerals. Also nuts and bolts for the most part have no means of determining if they are English fractional or metric millimeter in size.

Tools and fasteners are not designed so as to accommodate the average youngster, as he or she goes about the task of repairing, e.g., a bicycle or assembling projects in the home. In fact, tools and fasteners lack design that would allow a wide range of handicapped persons to more easily use them, such as, the visually impaired, or blind, or someone with a physical impairment, like a stroke victim that has lost the use of a limb, or a one-handed man.

There is lack of an indiscriminate method of determining English and metric systems of measurement and also lack of a truly simple method of color coding a small group of the most frequently used tools and fasteners as to their exact incremental sizes. Also, there is need of a method that would allow nuts and bolts to be temporarily secured into the sockets and wrenches during installation and removal.

The present invention offers a multidimensional method of identification that will aid a multitude of persons. Because of its unique features, the present invention has several advantages that would aid first responders in an emergency situation under adverse conditions, such as rescue workers or persons in National Defense.

Accordingly, it is a primary object of this invention to resolve the before-mentioned hindrances by providing a multidimensional method for coding tools and fasteners, thereby making their use more accessible for handicapped and non-handicapped persons alike. It is an objective of the present invention to provide a method for instantly determining all fractional sockets, wrenches, nuts and bolts as to their respective English system of measurement, through the human sense of sight and touch. It is an objective of the present invention to provide a method for instantly determining all millimeter sockets, wrenches, nuts and bolts as to the respective metric system of measurement through the human senses of sight and touch. It is an important objective of the present invention to provide a quick reference, visual color code for instantly determining a select group of the more frequently used English and fractional sizes of sockets, wrenches, nuts and bolts as to their respective incremental numeric measurement. It is further an objective of the present invention to provide a method in which the nuts and bolts are temporarily secured into the sockets and wrenches during the installation and removal process.

The before-mentioned objectives can be achieved through different embodiments of the present invention without departing from the scope of the invention. The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
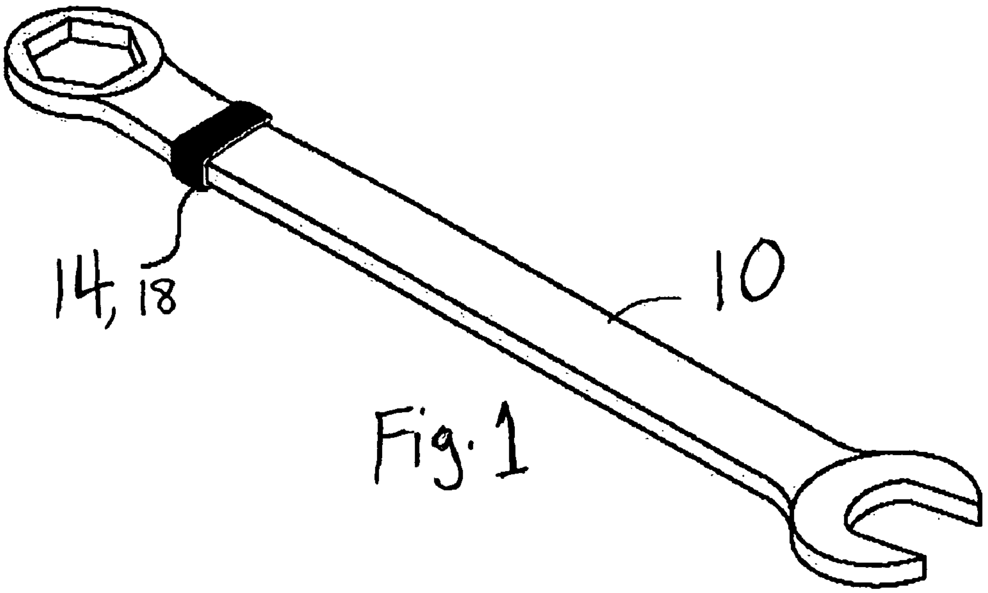
FIG. 1 is a perspective view of one embodiment of the present invention.

With regard to reference numerals used, the following numbering is used throughout the drawings.

| | |
|---|---|
| 10 | wrench |
| 12 | socket |
| 14 | indicator (English fractional system of measurement) |
| 16 | indicator (metric system of measurement) |
| 18 | indicia/securing feature |
| 20 | Color-coded indicator section |
| 22 | nut |
| 24 | bolt |
| 26 | blue |
| 28 | red |
| 30 | orange |
| 32 | yellow |
| 34 | green |
| 36 | brown |
| 38 | violet |
| 40 | light gray |

DETAILED DESCRIPTION OF THE PREFERRED EMBODIMENT

Turning now descriptively to the drawings, in which similar reference characters denote similar elements throughout the several views wherein FIGS. 1 through 10 illustrate the present invention wherein a method for identifying tools and sockets is discloses.

The tools and fasteners (wrenches, sockets, nuts and bolts) of the present invention provide a unique and easy to use multidimensional system of identification, that through natural human sensory perception, would allow visually impaired, or blind persons as well as non-visually impaired persons skilled in the art to instantly and easily distinguish the difference between the primary systems of measurement "English or metric" for the tools and fasteners they are working with. This primary coding system makes use of two of man's exterior senses, "sight and touch." It may be used on all the sizes of English and metric tools and fasteners.

Some of the size differences between tools of the English and the metric systems of measurement are so minute it is nearly impossible to distinguish the differences between them. This same problem arises with fasteners. Those that are manufactured with the English system of measurement are sometimes so minute in size differences from those manufactured with the metric system of measurement that it is nearly impossible to tell if they are English fractional or metric.

In the present invention, all wrenches, sockets, nuts and bolts of English fractional units of measurement would each be provided with a single indicator being effectively sized having a single portion of the same predetermined shape or design, with a part thereof raised above the surface of the tools and fasteners an effective distance, making the indicator both visibly and physically detectable through the senses of sight and touch.

All the wrenches, sockets, nuts and bolts of metric units of measurement could each be provided with a single, similar indicator being effectively sized having two interconnected portions of a predetermined shape or design that is distinguishably different than that used for the English sizes, also with a part thereof raised above the surface of the tools and fasteners an effective distance. A predetermined color, such as black or a dark gray, might be used to make the indicators of both the English and metric systems more visibly detectable.

Nuts and bolts marked according to the teachings of the present invention are marked on three equally spaced apart sides of their hexagon shapes with an effectively sized indicia and/or securing feature that is respective of their English or metric system of measurement.

The present invention further provides for those skilled in the art, a quick reference, visual color code, that may be used within the primary identification system and would allow persons to instantly visually select from the purposely chosen small number of only eight of the more frequently used English tools and fastener sizes and eight of the more frequently used metric tool and fastener sizes, according to their specific incremental numeric measurements. This could be achieved by changing the color (black or dark gray) used on the primary indicators for determining the English or metric system of measurement, with single different colors, each chosen from a group of eight basic colors, one different color to each size of a group of eight selected English sizes, and adding those exact same colors to eight selected metric sizes. These colors, respective of the English fractional incremental sizes they are assigned to are: (5/16 inch Blue) (3/8 inch Red) (7/16 inch Orange) (1/2 inch Yellow) (9/16 inch Green) (5/8 inch Brown) (11/16 inch Violet) and (3/4 inch Light Gray). These colors, respective of the metric sizes they are assigned to are: (10 mm. Blue) (11 mm. Red) (12 mm. Orange) (13 mm. Yellow) (14 mm. Green) (15 mm. Brown) (16 mm. Violet) and (17 mm. Light Gray).

This small number of eight colors is a purposefully chosen number for the quick reference color code, as is the number of the eight fractional sizes, and the eight metric sizes that those colors represent, because the human brain can easily remember eight single individual colors, as opposed to more. This is why no tool or fastener would use more than one single color to represent that particular incremental size. It is well know that during the course of most mechanical repairs and assembly work, at least one of the before mentioned sizes will be needed to perform that required task.

In one embodiment of the presentation, FIG. 1 shows a wrench 10 with a flat band of indicia 14, 18 that is colored and raised above the surface of the tool. It indicates the English fractional system of measurement.

Figure 2:
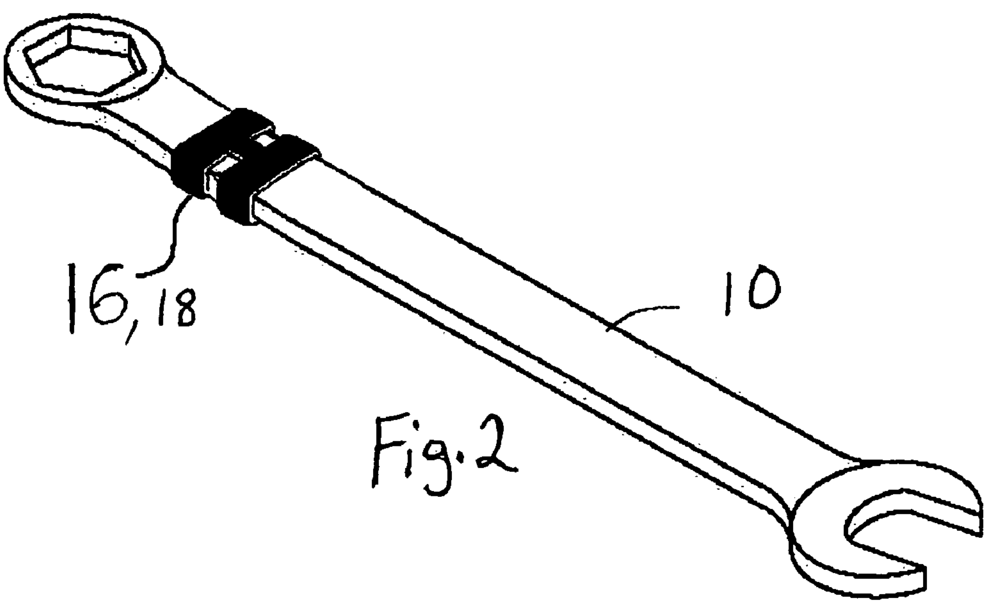
FIG. 2 is a perspective view of one embodiment of the present invention.

FIG. 2 shows a wrench 10 with a flat band of indicia 16, 18 of a different design that that of FIG. 1. It is also colored and raised above the surface of the tool and has two interconnected portions and indicates metric tools and fasteners. These bands of indicia may be coated or extruded onto the surface of the tools to a predetermined thickness that would allow them to be easily felt and viewed so as to determine the English or metric system of measurement through the following methods: a) electronically powder coating; b) coating with epoxy; c) coating with a rubber-like material such as PVC or silicone; or, d) manufacturing directly onto the surfaces of the tool.

Figure 3:
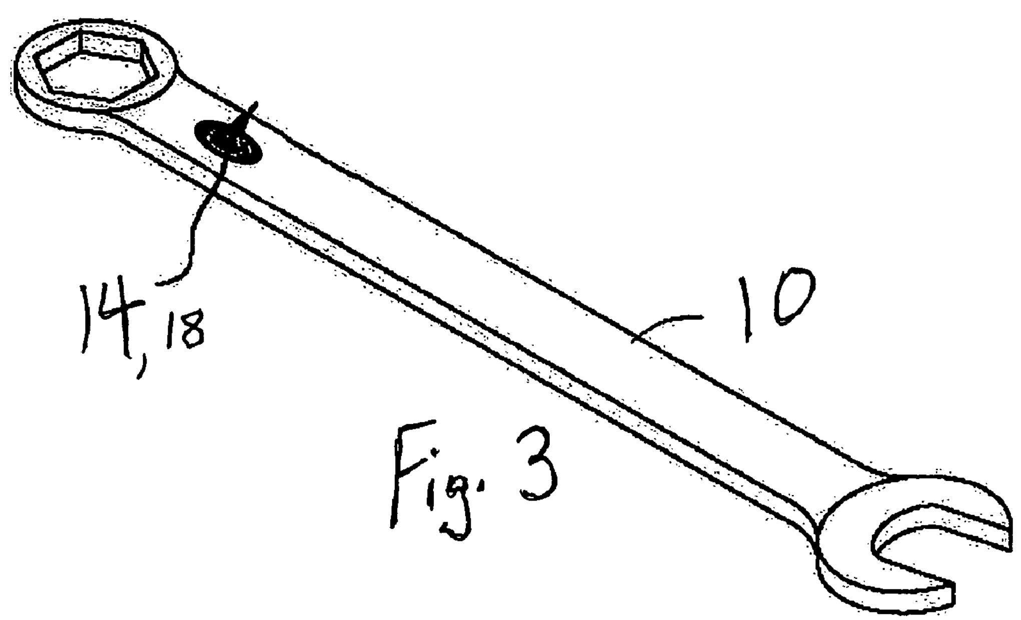
FIG. 3 is a perspective view of one embodiment of the present invention.

In another embodiment of the present invention FIG. 3 shows a wrench 10 with indicia 14, 18 that is a protrusion and is pointed much like a tear or rain drop. It is black or dark gray in color and is raised above the surface of the tool. It indicates the English fractional system of measurement.

Figure 4:
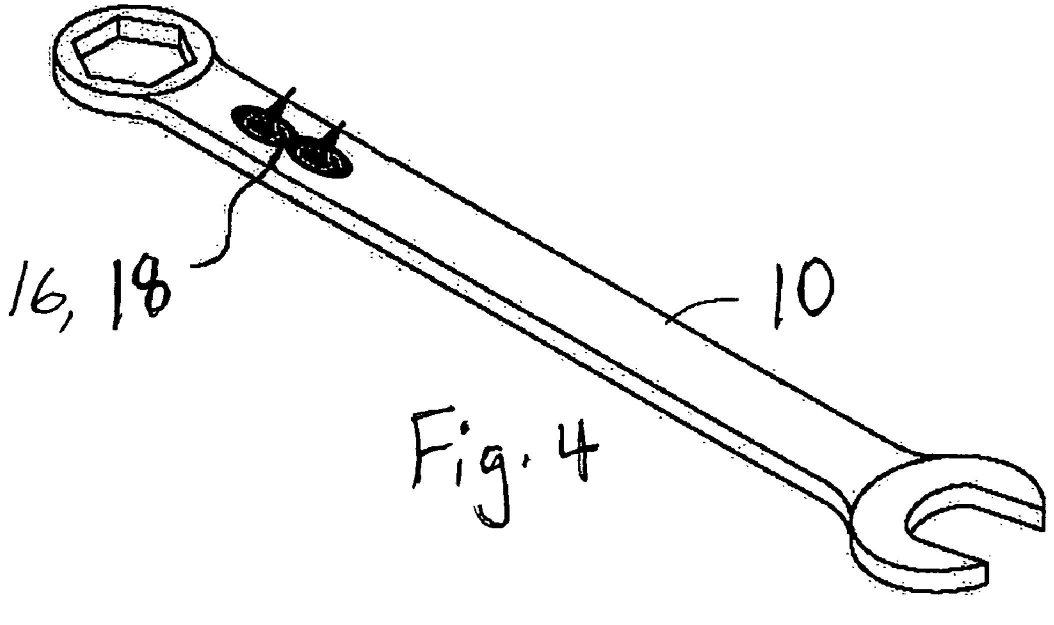
FIG. 4 is a perspective view of one embodiment of the present invention.

FIG. 4 shows a wrench 10 with indicia 16, 18 of a different design than that of FIG. 3. It is also black or dark gray in color, has two interconnected portions and protrusions, and raised above the surface of the tool. It indicates the metric system of measurement. Because these indicators are raised above the surface of the tools and are of a highly visible color in contrast to the tools, they would allow the tools to be easily identified by the user through the senses of sight and touch. These indicia/indicators could be extruded directly onto the surface of the tools and fasteners or holes could be drilled to a predetermined depth, and then a flexible, pliable, rubber-like material such as PVC or silicone could be extruded directly into the holes as another method of anchoring the indicia on the tools and fasteners.

Figure 3A:
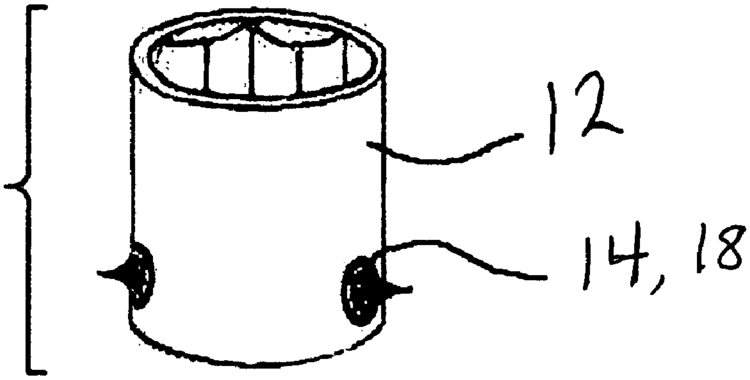
FIG. 3*a* is a perspective view of one embodiment of the present invention.

FIG. 3*a* shows a socket 12 that is marked with an indicia 14, 18 according to the teachings of FIG. 3.

Figure 4A:
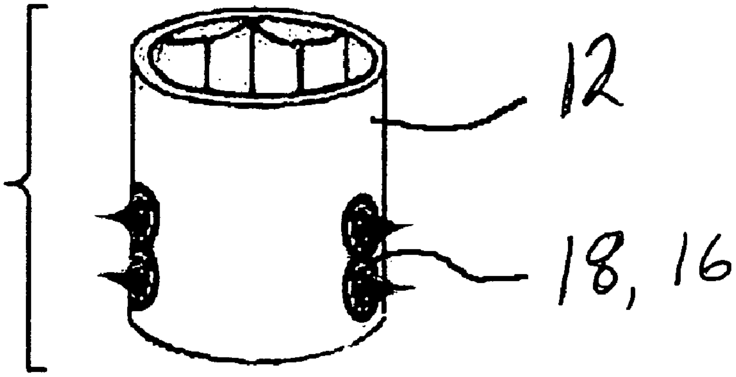
FIG. 4*a* is a perspective view of one embodiment of the present invention.

FIG. 4*a* shows a socket 12 that is marked with an indicia 16, 18 according to the teachings of FIG. 4. The indicia 14 and 18 could be placed at various conspicuous locations on the sockets so they are easily seen or felt by the user.

Figure 3B:
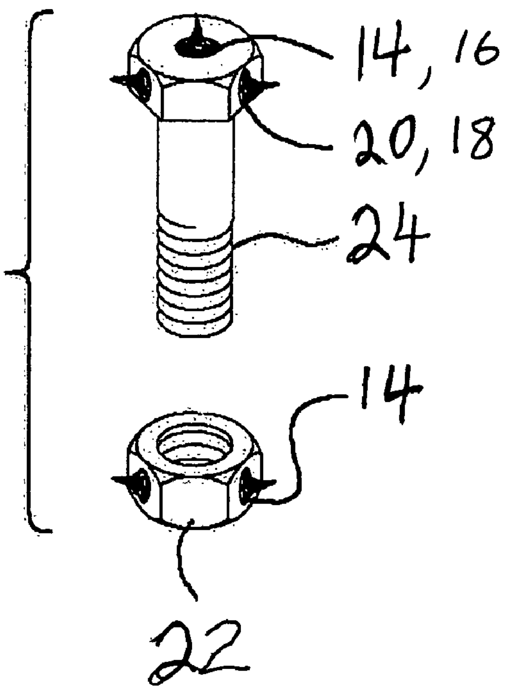
FIG. 3*b* is a perspective view of one embodiment of the present invention.

FIG. 3*b* shows a bolt 24 and a nut 22 marked according to the teachings of FIG. 3. The bolt is marked on top with indicia 14, 16 to indicate it is of the English system of measurement. The bolt and the nut are marked on three equally spaced apart sides of their hexagon according to the teachings of FIG. 3 with an effectively sized "indicia-securing feature" 18, 20 that is respective of their English system of measurement.

Figure 4B:
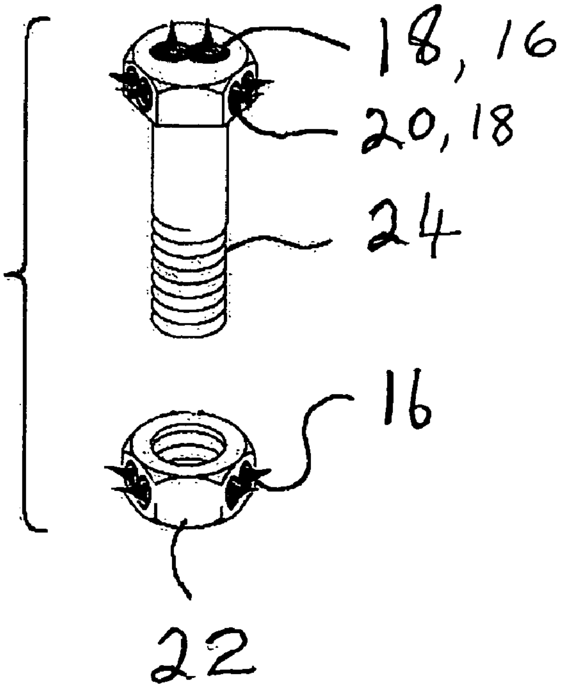
FIG. 4*b* is a perspective view of one embodiment of the present invention.

FIG. 4*b* shows a bolt 24 and a nut 22 marked according to the teachings of FIG. 4. This bolt is marked on top with indicia 16, 18 to indicate it is metric. This bolt and the nut are also marked on three equally spaced apart sides of their hexagon according to the teachings of FIG. 4 with an effectively sized "indicia-securing feature" 18, 20 that is respective of their metric system of measurement. Both the English and metric indicators of this system function as a special feature on the hexagon surface. They could be made of flexible or pliable rubber-like material. This material would fill up the space or the clearance between the outside surface of the head of the fasteners and inside surface of the wrenches. This would prevent the nuts and bolts from falling out of the sockets and wrenches.

Figure 5:
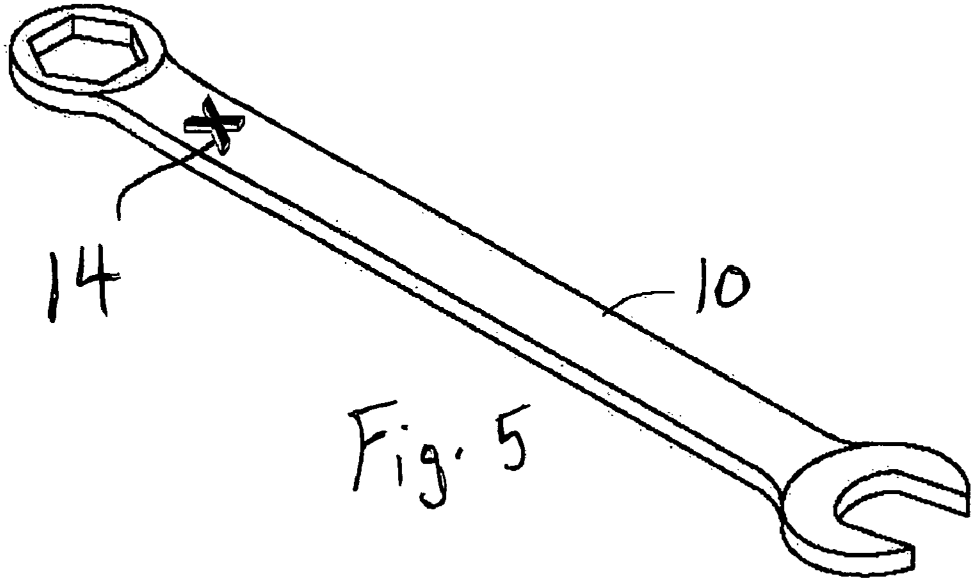
FIG. 5 is a perspective view of one embodiment of the present invention.

In still another embodiment, as shown in FIG. 5, which shows a wrench 10 with indicia 14 that is in the shape of the English alphabet letter X. It is colored and raised above the surface of the tool. The X indicates the English fractional system of measurement.

Figure 6:
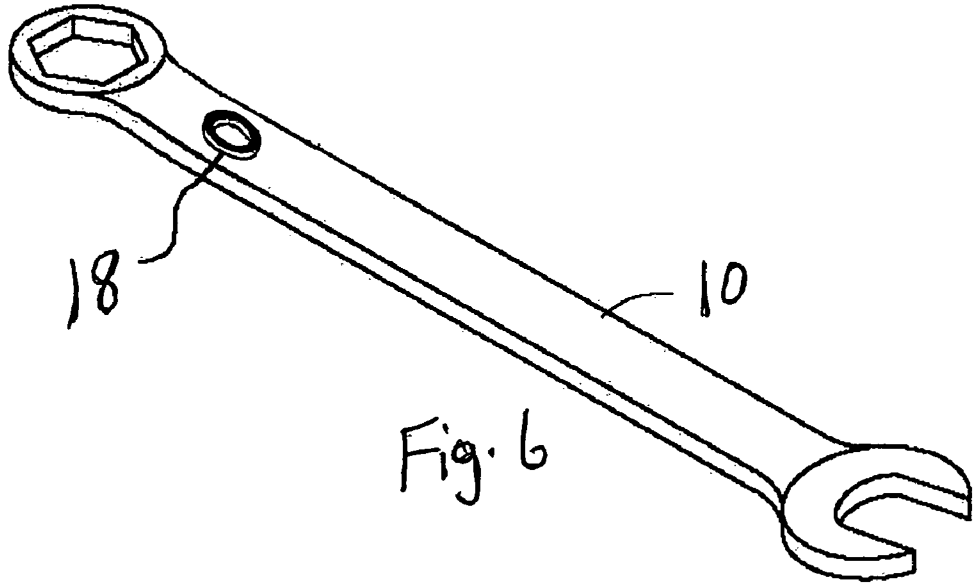
FIG. 6 is a perspective view of one embodiment of the present invention.

FIG. 6 shows a wrench 10 with indicia 18 that is in the shape of the English alphabet letter O. It is also colored and raised above the surface of the tool. The O indicates the metric system of measurement.

Because there are no geometric similarities between the X and the O, these English and metric indicators would be extraordinarily distinguishable from one another through the senses of sight and touch. It would not matter how many or how few of these indicators would appear on any particular wrench or socket, or what arrangement they might appear in as long as the X's only appeared on the English tools and fasteners and the O's only appeared on the metric tools and fasteners.

These indicators/indicia could be electrically powder-coated onto the sockets and wrenches of this invention to a desired thickness. The indicia could be coated or extruded onto the tools with a material like epoxy. The indicia could be coated onto the tools and fasteners to a desired thickness with rubber-like materials such as PVC or silicone. The indicia could be extruded onto the surface of the tools and fasteners with rubber-like materials such as PVC or silicone. The indicators X's and O's could be pre-formed to a conforming size for each tool and fastener and then attached to the tools and fasteners with glue or a sticky back. In one method the X's and O's could be forged onto the tools during the manufacturing process. These X's and O's could be coated with various colored material to make them more visible and, because they would be raised above the surface of the tools they would be highly detectable through the sense of touch. The X's and O's could be imprinted into the hexagon surfaces of nuts and bolts and a flexible material could be extruded into them to a thickness that projects above the surface, making them easily distinguishable to sight and touch. Also, this would prevent the nuts and bolts from falling out of the sockets and wrenches during the installation and removal process.

Figure 6A:
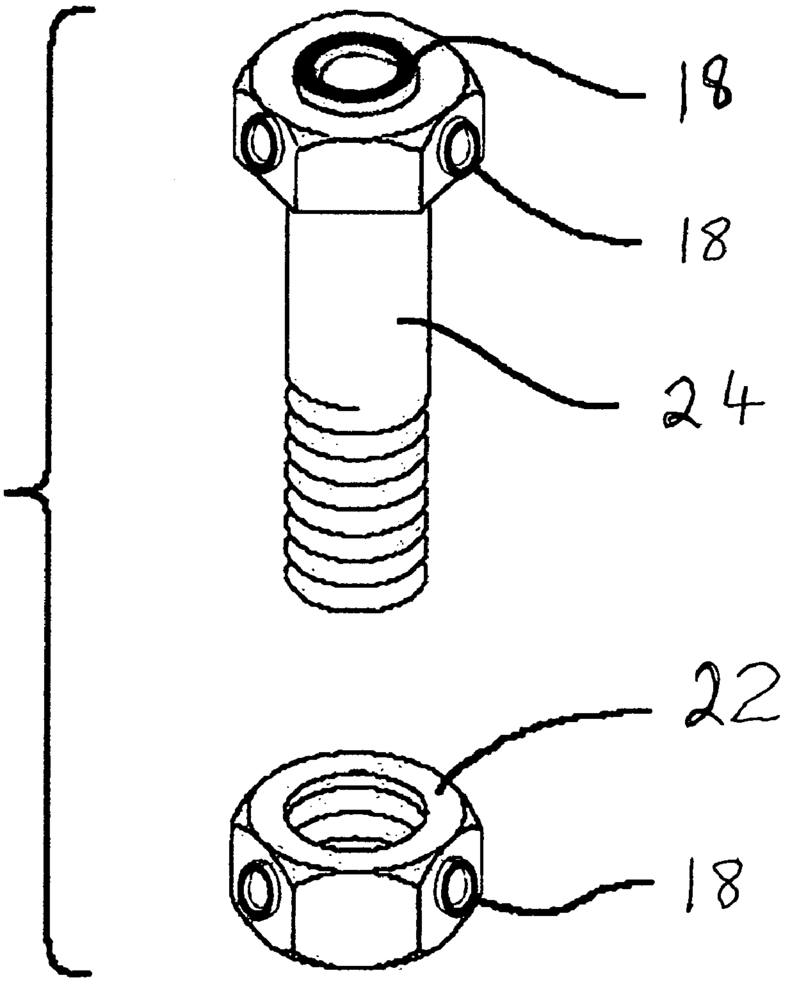
FIG. 6*a* is a perspective view of one embodiment of the present invention.

FIG. 6*a* shows a nut 22 and a bolt 24 marked according to the teachings of FIG. 6. The indicia 18 on top of the bolt indicates the bolt is of the metric system of measurement. The indicia and/or securing element 18 is located on three equally spaced apart sides of the hexagon surface of the bolt and nut. This indicator is always respective of the system of measurement to which the fastener belongs in both the English and the metric systems. These indicators being effectively sized also provide the function of securing the nut or bolt into the wrench or socket so they are not dropped. In another method, large X's and O's could be imprinted onto or into the surface of the tools and fasteners and left unfilled or uncolored. This would still make the English tools and fasteners easily distinguishable from the metric tools and fasteners.

Figure 7:
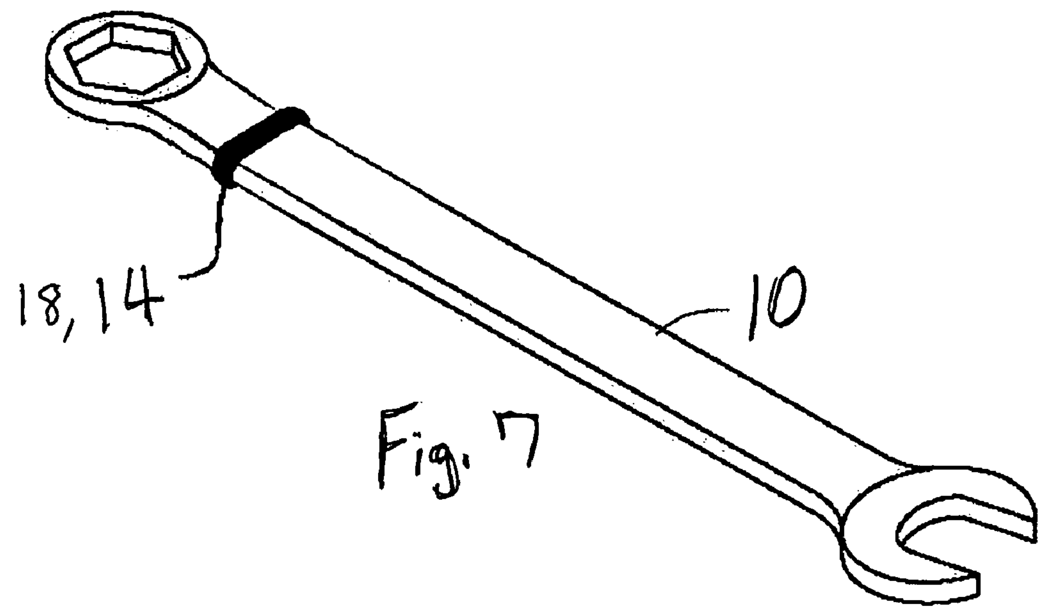
FIG. 7 is a perspective view of one embodiment of the present invention.

In another embodiment, FIG. 7 shows a wrench 10 with indicia 14, 18 that is like an O-ring. It is placed around the tool. It is colored and projects above the surface of the tool. This indicia identifies the English system of measurement.

Figure 8:
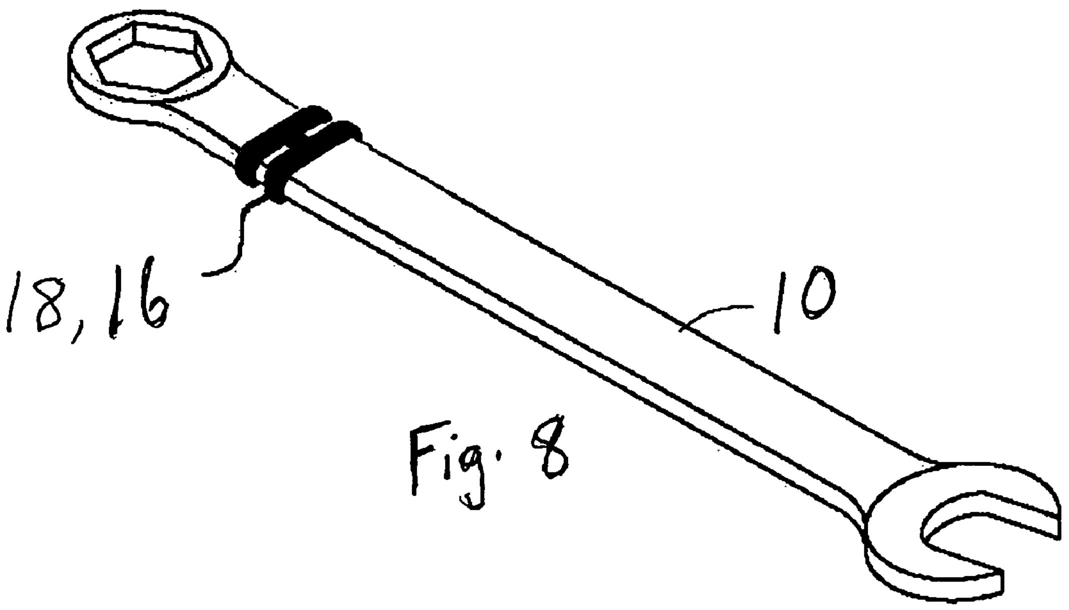
FIG. 8 is a perspective view of one embodiment of the present invention.

FIG. 8 shows a wrench 10 with indicia 16, 18 of a different design than that of FIG. 7. This indicia looks like two O-rings that are separated by a space and are connected to one another in at least one point to make a single indicator. It is also colored and projects above the surface of the tool. It identifies that the tool is of the metric system of measurement. These indicia may easily be felt and viewed by the user.

The indicia may be made of rubber-like material such as PVC or silicone. A groove could be provided in the surface of the tools and fasteners in which a pre-formed indicia could be placed. In another method the indicia could be extruded into the groove, or it could be extruded directly onto the surface of the tools and fasteners. This indicia could be preformed with a flat surface on the inside that would allow for some type of adhesive for bonding them to the tools and fasteners.

Figure 7A:
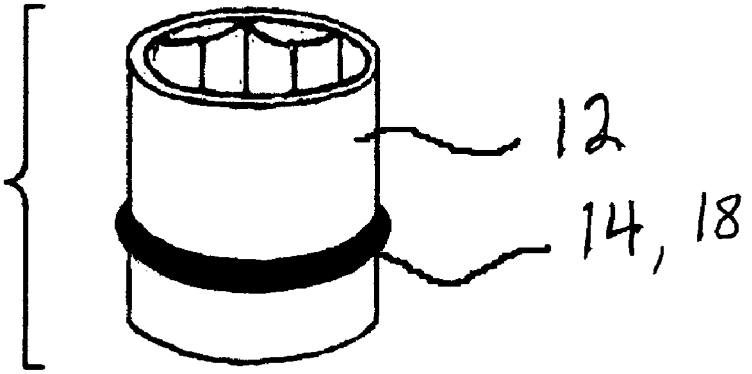
FIG. 7*a* is a perspective view of one embodiment of the present invention.

FIG. 7*a* shows a socket 12 that is marked according to the teachings of FIG. 7.

Figure 8A:
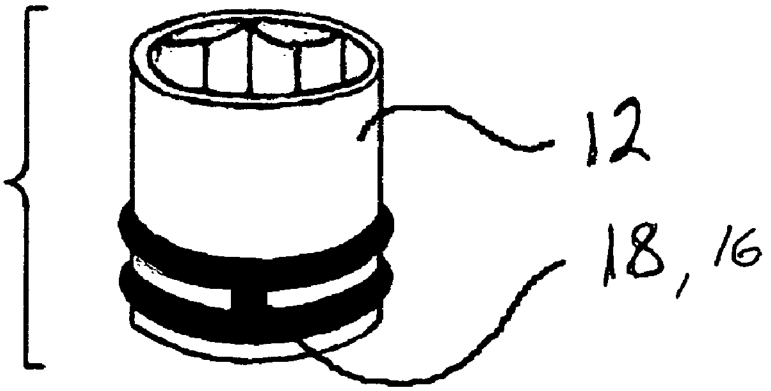
FIG. 8*a* is a perspective view of one embodiment of the present invention.
Figure 7B:
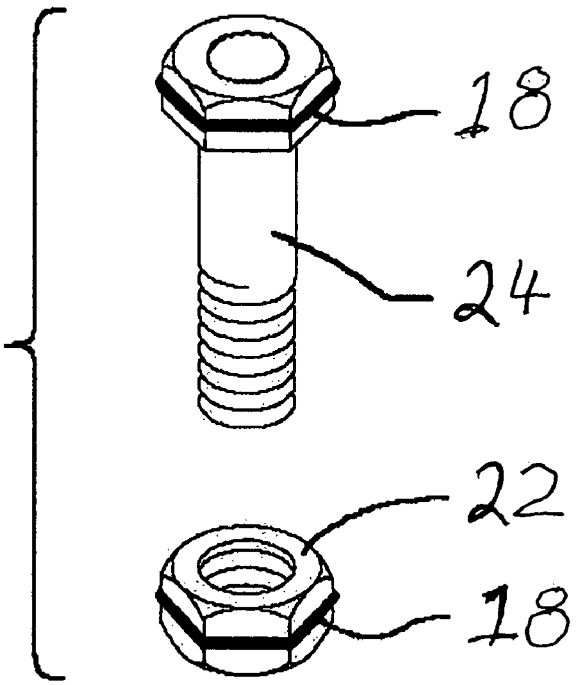
FIG. 7*b* is a perspective view of one embodiment of the present invention.
Figure 8B:
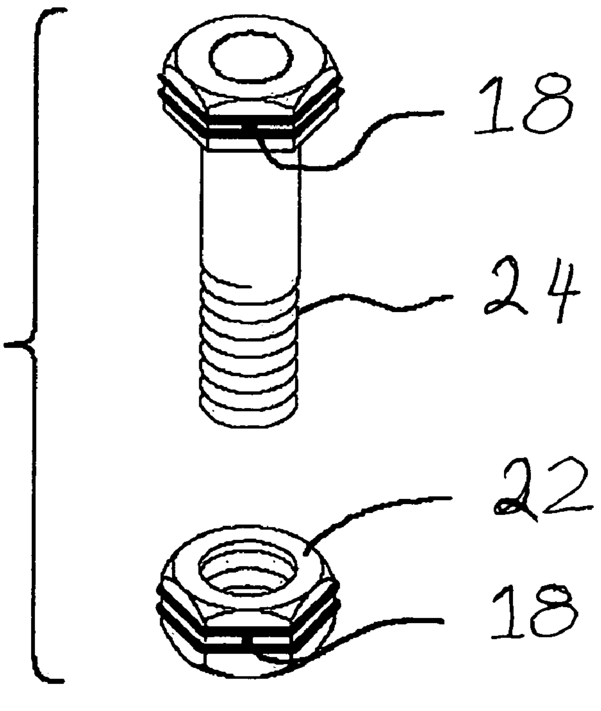
FIG. 8*b* is a perspective view of one embodiment of the present invention.

FIG. 8*a* shows a socket 12 that is marked according to the teachings of FIG. 8. FIG. 7*b* shows a bolt 24 and nut 22 that are marked according to the teachings of FIG. 7. FIG. 8*b* shows a bolt 24 and nut 22 that are marked according to the principles of FIG. 8. In FIG. 7*b* and FIG. 8*b* the indicia that determine the system of measurement and the special feature that prevents the nuts and bolts from dropping out of the tools are represented by the element number 18.

The following sizes and colors are respective of sockets, wrenches, nuts and bolts throughout the present invention.

Figure 9:
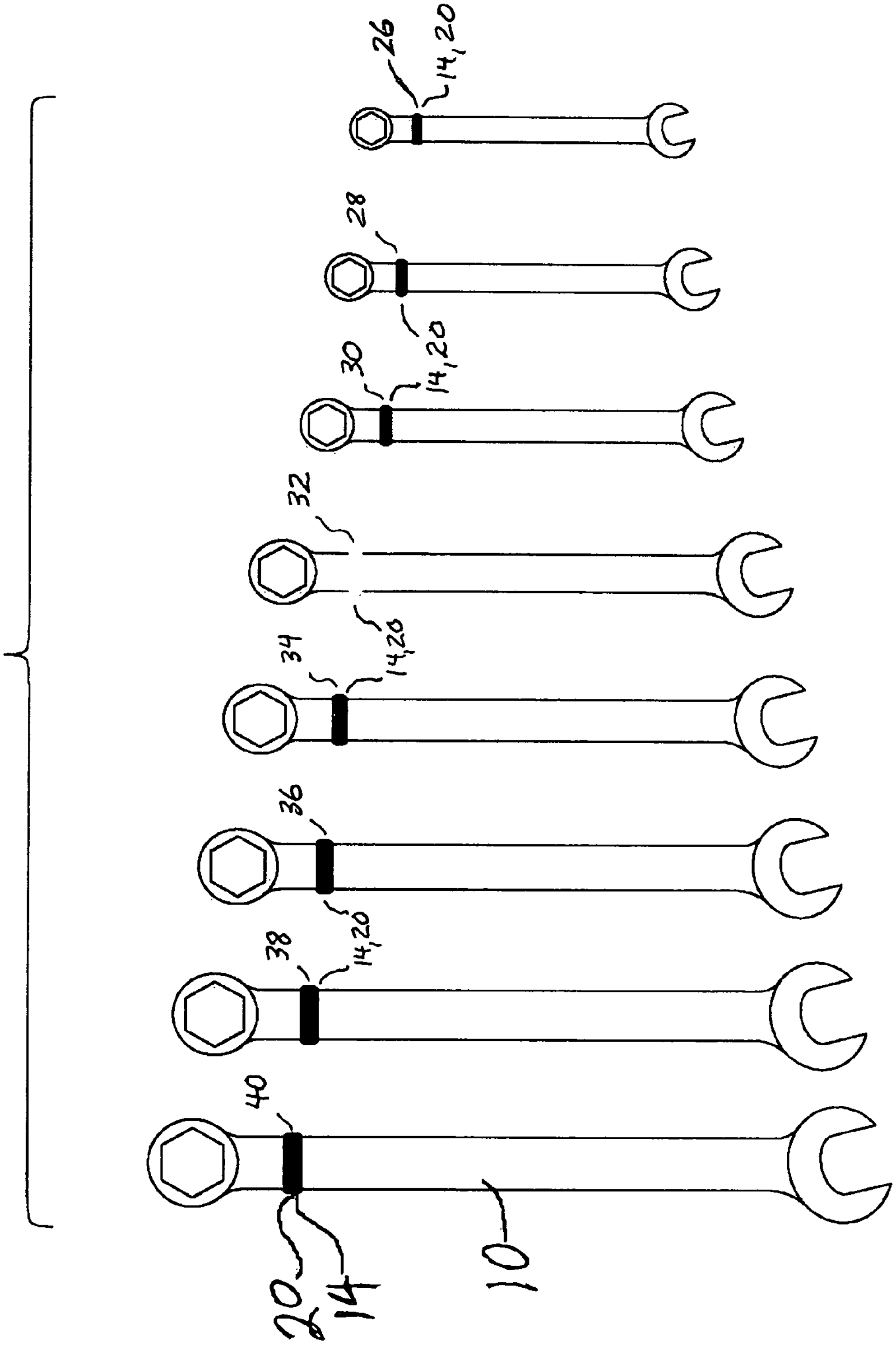
FIG. 9 is a plan view of one embodiment of the present invention showing the color scheme.

FIG. 9 shows eight of the most commonly used sizes of wrenches 10 identified by eight basic colors as follows: blue 26, red 28, orange 30, yellow 32, green 34, brown 36, violet 38 and light gray 40. The wrenches are of the English fractional system of measurement, ranging in size from 5/16" to 3/4" and marked with an indicator 14 according to the teachings of FIG. 1. Each of the wrenches in FIG. 9 is furnished with a (Quick Reference) color-coded indicator section 20. This would make each of the eight different English sizes of tools and fasteners rapidly identifiably by their individual color.

Figure 10:
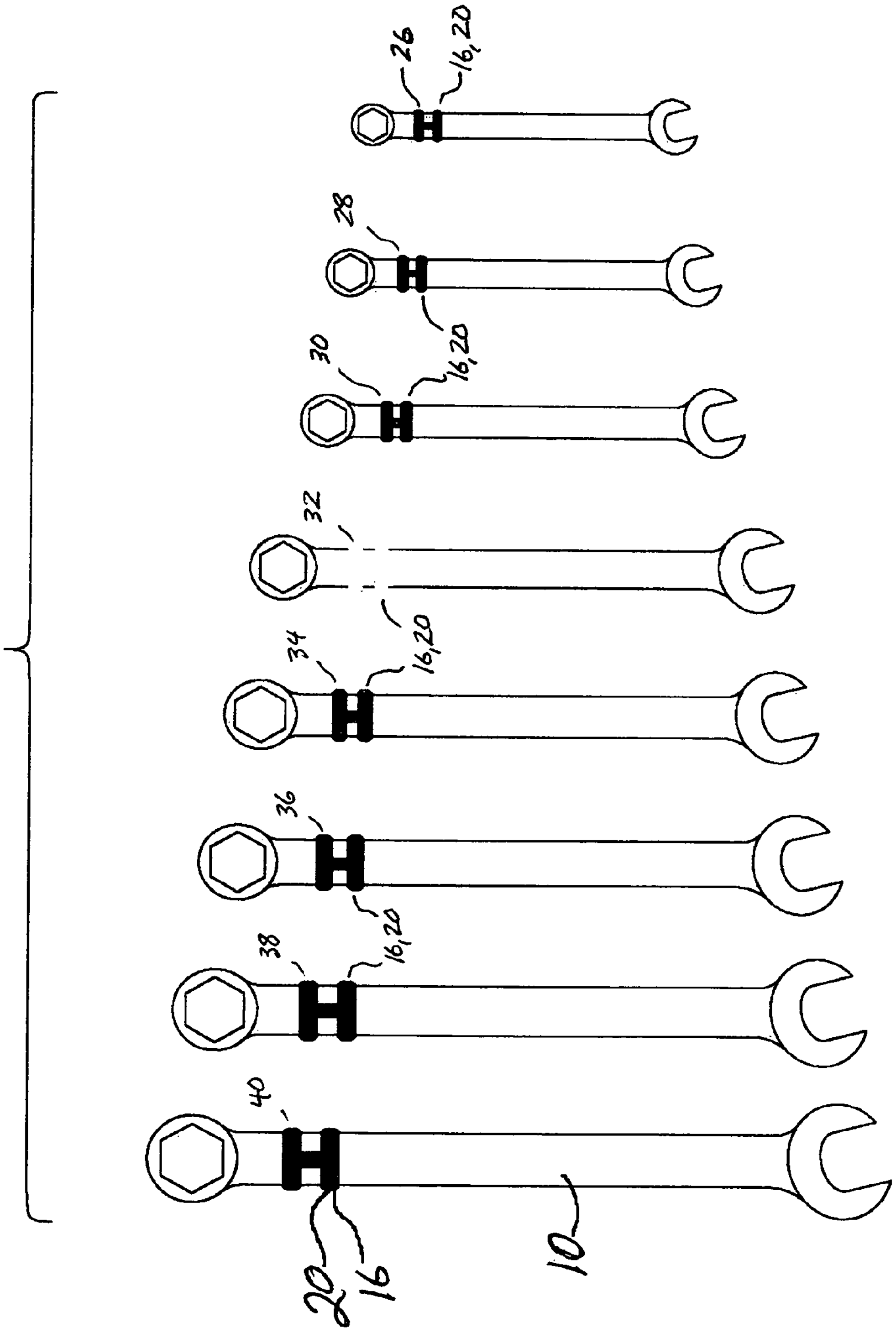
FIG. 10 is a plan view of one embodiment of the present invention showing the color scheme.

FIG. 10 shows eight of the most commonly used sizes of wrenches 10 identified by eight basic colors as follows: blue 26, red 28, orange 30, yellow 32, green 34, brown 36, violet 38 and light gray 40. The wrenches are of the metric system of measurement, ranging in size from 10 mm. to 17 mm. and are marked with an indicator 16 according to the principles of FIG. 2. Each of the wrenches in FIG. 10 are furnished with a (Quick Reference) color-coded indicator section 20. This would make each of the eight difference metric sizes of tools and fasteners rapidly identifiable by their individual color.

The eight basic colors that are used are: blue 26, red 28, orange 30, yellow 32, green 34, brown 36, violet 38 and gray 40. No tool or fastener uses more than one color on each size. The English and metric tools and fasteners use the exact same colors, in the exact same order from blue on the smallest size to gray on the largest size, all within the selected (Quick Reference) indicator group of the tools and fasteners. Any tools or fastener smaller than (blue 5/16") or (blue 10 mm.) and larger than (gray 5/16") or (gray 17 mm.) would be represented with black or a very dark gray. The tools and fasteners correspond by color. This system greatly simplifies the use of tools and fasteners, making them more user-friendly to a much larger number of people.

We claim:

1. A method for identifying tools, comprising the steps of:

a) providing a tool, wherein the tool is chosen from the group including a wrench, a socket, a nut, and a bolt; and b) applying a color-coded indicia onto the tool, wherein the indicia is visible to a user, wherein the indicia aids in identifying the tool, wherein the colors are chosen from the group including blue, red, orange, yellow, green, brown, violet and light gray;

c) wherein the indicia is a band, the band being substantially flat, the band being raised an effective distance above the surface of the tool, wherein the band can be felt by a user, wherein the band aids in identifying the tool; and, d) wherein the band has two interconnected portions, wherein the two interconnected portions can be felt by a user to identify metric size tools.

2. The method of claim 1, wherein the metric size tools are chosen from the group including 10 mm, 11 mm, 12 mm, 13 mm, 14 mm, 15 mm, 16 mm and 17 mm.

3. The method of claim 2, wherein the indicia is applied to three equally spaced apart sides of the bolt being of an effective size to secure the bolt in a socket.

4. The method of claim 2, wherein the indicia is applied to three equally spaced apart sides of the nut being of an effective size to secure the nut in a socket.

5. A method for identifying tools, comprising the steps of:

a) providing a tool, wherein the tool is chosen from the group including a wrench, a socket, a nut, and a bolt; and b) applying a color-coded indicia onto the tool, wherein the indicia is visible to a user, wherein the indicia aids in identifying the tool, wherein the colors are chosen from the group including blue, red, orange, yellow, green, brown, violet and light gray;

c) wherein the indicia is a band, the band being substantially flat, the band being raised an effective distance above the surface of the tool, wherein the hand can be felt by a user, wherein the band aids in identifying the tool; and, d) wherein the band has two interconnected portions, wherein the two interconnected portions can be felt by a user to identify metric size tools; and e) wherein the two interconnected portions are each substantially shaped like an O-ring.

6. A method for identifying tools, comprising the steps of:

a) providing a tool, wherein the tool is chosen from the group including a wrench, a socket, a nut, and a bolt; and b) applying a color-coded indicia onto the tool, wherein the indicia is visible to a user, wherein the indicia aids in identifying the tool, wherein the colors are chosen from the group including blue, red, orange, yellow, green, brown, violet and light gray;

c) wherein the indicia is a protrusion being substantially shaped like a tear drop having a pointed end thereof extending outwardly, the protrusion being substantially flat, the protrusion being raised an effective distance above the surface of the tool; and, d) wherein the band has a single portion, wherein the single portion can be felt by a user to identify English size tools.

7. The method of claim 6, wherein the tear drop shaped protrusion has two interconnected portions, wherein the two interconnected portions can be felt by a user to aid in identifying metric size tools.

8. A method for identifying tools, comprising the steps of:

a) providing a tool, wherein the tool is chosen from the group including a wrench, a socket, a nut, and a bolt; and b) applying a color-coded indicia onto the tool, wherein the indicia is visible to a user, wherein the indicia aids in identifying the tool, wherein the colors are chosen from the group including blue, red, orange, yellow, green, brown, violet and light gray;

c) wherein the indicia is a protrusion being substantially shaped like an "X", the protrusion being substantially flat, the protrusion being raised an effective distance above the surface of the tool; and, d) wherein the "X" can be felt by a user to identify English size tools.

9. A method for identifying tools, comprising the steps of:

a) providing a tool, wherein the tool is chosen from the group including a wrench, a socket, a nut, and a bolt; and b) applying a color-coded indicia onto the tool, wherein the indicia is visible to a user, wherein the indicia aids in identifying the tool, wherein the colors are chosen from the group including blue, red, orange, yellow, green, brown, violet and light gray;

c) wherein the indicia is a band. the band being substantially flat, the band being raised an effective distance above the surface of the tool wherein the band can be felt by a user, wherein the band aids in identifying the tool; and, d) wherein the band has a single portion, wherein the single portion can be felt by a user to identify the English tools chosen from the group including 5/16", 3/8", 7/16", 1/2", 9/16", 5/8", 11/16" and 3/4", and wherein the indicia is applied to three equally spaced apart sides of the bolt being of an effective size to secure the bolt in a socket.

10. A method for identifying tools, comprising the steps of:

a) providing a tool, wherein the tool is chosen from the group including a wrench, a socket, a nut, and a bolt; and b) applying a color-coded indicia onto the tool, wherein the indicia is visible to a user, wherein the indicia aids in identifying the tool, wherein the colors are chosen from the group including blue, red, orange, yellow, green, brown, violet and light gray;

c) wherein the indicia is a band. the band being substantially flat, the band being raised an effective distance above the surface of the tool wherein the band can be felt by a user, wherein the band aids in identifying the tool; and, d) wherein the band has a single portion, wherein the single portion can be felt by a user to identify the English tools chosen from the group including 5/16", 3/8", 7/16", 1/2", 9/16", 5/8", 11/16" and 3/4", and wherein the indicia is applied to three equally spaced apart sides of the nut being of an effective size to secure the nut in a socket.

* * * * *